United States Patent [19]

Nagle et al.

[11] Patent Number: 4,774,052

[45] Date of Patent: * Sep. 27, 1988

[54] COMPOSITES HAVING AN INTERMETALLIC CONTAINING MATRIX

[75] Inventors: Dennis C. Nagle, Elliott City; John M. Brupbacher; Leontios Christodoulou, both of Baltimore, Md.

[73] Assignee: Martin Marietta Corporation, Bethesda, Md.

[*] Notice: The portion of the term of this patent subsequent to Dec. 2, 2004 has been disclaimed.

[21] Appl. No.: 873,890

[22] Filed: Jun. 13, 1986

Related U.S. Application Data

[63] Continuation-in-part of Ser. No. 662,928, Oct. 19, 1984, abandoned.

[51] Int. Cl.[4] .............................................. C22C 1/00
[52] U.S. Cl. .................................... 420/129; 420/590
[58] Field of Search ............................ 420/129, 590

[56] References Cited

U.S. PATENT DOCUMENTS

| | | | |
|---|---|---|---|
| 3,726,643 | 4/1973 | Merzhanov et al. | 423/409 |
| 4,161,512 | 7/1979 | Merzhanov et al. | 423/440 |
| 4,431,448 | 2/1984 | Merzhanov et al. | 75/238 |
| 4,444,603 | 4/1984 | Yamatsuta et al. | 148/127 |
| 4,478,791 | 10/1984 | Huang et al. | 420/590 |
| 4,540,546 | 9/1985 | Giessen | 420/590 |

Primary Examiner—Christopher W. Brody
Attorney, Agent, or Firm—Herbert W. Mylius; Gay Chin

[57] ABSTRACT

This invention relates to a composite material comprising an in-situ precipitated second phase in an intermetallic matrix, and to the process for making such a composite.

64 Claims, 3 Drawing Sheets

COMPOSITES HAVING AN INTERMETALLIC CONTAINING MATRIX

This application is a Continuation-In-Part of U.S. patent application Ser. No. 662,928, filed Oct. 19, 1984 now abandoned.

The present invention relates generally to a process for forming composite materials and to a composite product having an intermetallic containing matrix including an in-situ precipitation of a second phase, such as another intermetallic phase or a ceramic material, wherein the second phase comprises a boride, carbide, oxide, nitride, silicide, sulfide, etc., or intermetallic of one or more metals.

BACKGROUND OF THE INVENTION

For the past several years, extensive research has been devoted to the development of metal-ceramic composites, such as aluminum reinforced with carbon, boron, silicon carbide, silica, or alumina fibers, whiskers, or particles. Metal-ceramic composites with good high temperature yield strengths and creep resistance have been fabricated by the dispersion of very fine (less than 0.1 micron) oxide or carbide particles throughout the metal or alloy matrix. However, this metal ceramic composite technology has not heretofore been extended to include intermetallic matrices. Prior art techniques for the production of metal-ceramic composites may be broadly categorized as powder metallurgical approaches, molten metal techniques, and internal oxidation processes.

The powder metallurgical type production of such dispersion-strengthened composites would ideally be accomplished by mechanically mixing metal powders of approximately 5 micron diameter or less with the oxide or carbide powder (preferably 0.01 micron to 0.1 micron). High speed blending techniques or conventional procedures such as ball milling may be used to mix the powder. Standard powder metallurgy techniques are then employed to form the final composite. Conventionally, however, the ceramic component is large, i.e., greater than 1 micron, due to a lack of availability, and high cost, of very small particle size materials since their production is energy intensive, time consuming, and costly in capital equipment. Furthermore, production of very small particles inevitably leads to contamination of the particles with oxides, nitrides, and materials from various sources such as the attritor (e.g., iron). The presence of these contaminants inhibits particulate-to-metal bonding which in turn compromises the mechanical properties of the resultant composites. Further, in many cases where the particulate materials are available in the desired size, they are extremely hazardous due to their pyrophoric nature.

Alternatively, it is known that proprietary processes exist for the direct addition of appropriately coated ceramics to molten metals. Further, molten metal infiltration of a continuous ceramic skeleton has been used to produce composites. In most cases, elaborate particle coating techniques have been developed to protect the ceramic particles from the molten metal during admixture or molten metal infiltration, and to improve bonding between the metal and ceramic. Techniques such as these have resulted in the formation of silicon carbide-aluminum composites, frequently referred to as SiC/Al, or SiC aluminum. This approach is only suitable for large particulate ceramics (e.g., greater than 1 micron) and whiskers, because of the high pressures involved for infiltration. The ceramic material, such as silicon carbide, is pressed to form a compact, and liquid metal is forced into the packed bed to fill the intersticies. Such a technique is illustrated in U.S. Pat. No. 4,444,603, of Yamatsuta et al, issued Apr. 24, 1984. Because of the necessity for coating techniques and molten metal handling equipment capable of generating extremely high pressures, molten metal infiltration has not been a practical process for making metal-ceramic composites.

The presence of oxygen in ball-milled powders used in prior art powder metallurgy techniques, or in molten metal infiltration, can result in oxide formation at the interface between the ceramic and the metal. The presence of such oxides will inhibit interfacial binding between the ceramic phase and the matrix, thus adversely effecting ductility of the composite. Such weakened interfacial contact can also result in reduced strength, loss of elongation, and facilitated crack propagation. In addition, the matrix may be adversely effected, as in the case of titanium which is embrittled by interstitial oxygen.

Because of the above-noted difficulties with conventional processes, the preparation of metal-ceramic composites with submicron ceramic dispersoids for commercial applications has been extremely expensive.

Internal oxidation of a metal containing a more reactive component has also been used to produce dispersion strengthened metals, such as internally oxidized aluminum in copper. For example, when a copper alloy containing about 3 percent aluminum is placed in an oxidizing atmosphere, oxygen may diffuse through the copper matrix to react with the aluminum, precipitating alumina. This technique, although limited to relatively few systems since the two metals utilized must have a wide difference in chemical reactivity, has offered a feasible method for dispersion hardening. However, the highest possible level of dispersoids formed in the resultant dispersion strengthened metal is generally insufficient to impart significant changes in properties such as modulus, hardness, and the like. In addition, oxides are typically not wetted by the metal matrix, so that interfacial bonding is not optimum.

In recent years, numerous ceramics have been formed using a process referred to as self-propagating high-temperature synthesis (SHS), which involves an exothermic, self-sustaining reaction which propagates through a mixture of compressed powders. Generally, the SHS process is ignited by electrical impulse, thermite, or spark. The SHS process involves mixirg and compacting powders of the constituent elements, and igniting the green compact with a suitable heat source. On ignition, sufficient heat is released to support a self-sustaining reaction, which permits the use of sudden, low power initiation of high temperatures, rather than bulk heating over long times at lower temperatures. Exemplary of these techniques are the patents of Merzhanov et al. In U.S. Pat. No. 3,726,643, there is taught a method for producing high-melting refractory inorganic compound by mixing at least one metal selected from groups IV, V, and VI of the Periodic System with a non-metal such as carbon, boron, silicon, sulfur, or liquid nitrogen, and locally heating the surface of the mixture to produce a local temperature adequate to initiate a combustion process. In U.S. Pat. No. 4,161,512, a process is taught for preparing titanium carbide by localized ignition of a mixture consisting of 80-88 percent titanium and 20-12 percent carbon, resulting in an exothermic reaction of the mixture under conditions of layer-by-layer combustion. These references deal with the preparation of ceramic materials, in the absence of a second non-reactive metallic phase.

U.S. Pat. No. 4,431,448 teaches preparation of a 35rd alloy by intermixing powders of titanium, boron, carbon, and a Group I-B binder metal, such as copper or silver, compression of the mixture, local ignition thereof to initiate the exothermic reaction of titanium with boron and carbon, and propagation of the reaction, resulting in an alloy comprising titanium diboride, titanium carbide, and the binder metal. This reference, however, is limited to the use of Group I-B metals such as copper and silver, as binders. As is set forth in the patent, products made by this method have low density, requiring subsequent compression and compaction.

Another class of materials which has seen considerable interest and development is intermetallic materials, especially intermetallics of aluminum such as the aluminides of titanium, zirconium, iron, cobalt, and nickel.

The need for the advanced properties obtainable with intermetallic materials is typified by their potential application to structures capable of withstanding high temperatures, such as turbine engines. In designing and operating turbine engines today and for the foreseeable future, there are two primary problem which demand solutions from the field of materials science. The first of these is the need to operate certain portions of the engine at higher gas and metal temperatures to improve operating efficiency and save fuel. The second problem is the need for lighter materials to decrease engine weight and engine operating stresses due to heavy rotating components, and to increase the operating life of disks, shafts, and bearing support structures. These latter structures require materials which are less dense than the nickel base superalloys they are intended to replace, but which possess roughly the same mechanical properties and oxidation resistance as those materialsin current usage.

The intermetallics are typically highly ordered compounds, in the sense that they possess regularly repeating (e.g., A B A B A B) atom sequencing. Intermetallic compounds are particularly suited to these needs because of two properties which derive from the fact that they possess ordered structures. Modulus retention at elevated temperature in these materials is particularly high because of strong A-B bonding. In addition, a number of high temperature properties which depend on diffusive mechanisms, such as creep, are improved because of the generally high activation energy required for self-diffusion in ordered alloys.

The formation of long range order in alloy systems also frequently produces a significant positive effect on mechanical properties, including elastic constants, strength, strain-hardening rates, and resistance to cyclic creep deformation. Finally, in the case of aluminides, the resistance to surface oxidation is particularly good because these materials contain a large reservoir of aluminum that is preferentially oxidized.

However, during metallurgical processing, one problem encountered is that these materials tend to form coarse grains, which degrade certain mechanical properties, the most important of which is ductility. Also, in many intermetallics the strong A-B bonding results in low temperature brittleness, although the exact mechanism of the ductile-brittle transition seems to be different for the different intermetallic compounds. It is thus necessary to address the problem of minimal low temperature ductility without destroying the inherent high temperature strength and stiffness. In the prior art it has generally been considered that these latter high temperature properties may only be retained by preserving the ordered structure, hence sacrificing low temperature ductility.

Since the early 1970's, the pace of work on ordered alloys and intermetallic compounds has slackened, as a result of lack of progress in improving either ductility or creep resistance of these otherwise very intriguing alloys.

Interest in utilizing ordered alloys for structural applications was reawakened in this country when researchers discovered that ductility and strength improvements could be achieved in TiAl and $Ti_3Al$ based alloys using a combination of powder metallurgy and alloying techniques. Later work on the titanium aluminides utilized ingot metallurgy. The development of rapid solidification methods led to renewed interest in the iron and nickel aluminides. The replacement of cobalt in $Co_3V$ by nickel, and then iron, led to a series of face-centered cubic $Ll_2$-type superlattices with greater ductility at ambient temperatures. Also, it has been reported in Japan that polycrystalline $Ni_3Al$ can be made more ductile by adding small quantities of boron. Later, this work was confirmed and the critical composition range over which boron was beneficial was identified. (See U.S. Pat. No. 4,478,791 of Huang et al, assigned to General Electric.) These discoveries, together with the national search for replacements for strategic metals, such as cobalt and chromium, and the need to develop energy-efficient systems, have in the past few years or two stimulated much additional work; largely in the area of improving low temperature ductility and increasing high temperature strength.

Despite these efforts, little progress has been made in developing practical intermetallic compositions that have sufficiently improved low temperature ductility while maintaining high temperature strength.

SUMMARY OF THE INVENTION

It is an object of the present invention to provide a method for forming composite materials of discretely dispersed particulate second phase materials in intermetallic containing matrices, particularly in aluminide containing matrices. The dispersed material may constitute a second phase such as a ceramic, or an intermetallic compound other than the matrix material.

It is a further object of this invention to provide a method for dispersion strengthening of intermetallics such as aluminides. It is a particular object of this invention to provide a method for the formation of one or more nitride, boride, sulfide, silicide, oxide, and carbide particulates in a matrix of one or more intermetallic materials.

It is yet a further object of the invention to produced composites having an intermetallic containing matrix which has fine grains for improved ductility and mechanical properties while retaining the high temperature characteristics of the intermetallics.

It is also an object of the present invention to provide an intermetallic composite material which may be subjected to conventional metallurgical processing steps, such as remelting, annealing, working, extrusion, etc.

Generally, the present invention relates to a process for forming composite materials comprising finely divided ceramic or other second phase particles in an intermetallic containing matrix by an in-situ precipitation of up to about 95 percent by volume of ceramic material in the matrix or precursors thereof, wherein the ceramic comprises a boride, carbide, oxide, nitride, oxynitride, silicide, sulfide, oxysulfide or a mixture thereof. It has been found that by mixing the constituents or elements of the desired second phase material with a solvent matrix material comprising an intermetallic or precursors thereof, and heating to a temperature at which an exothermic reaction which forms the second phase is initiated, a solvent assisted reaction ensues, resulting in the extremely rapid formation and dispersion of finely divided particles of the second phase material in the matrix material. Where the reaction takes place in a single metal which is a precursor of an intermetallic, a subsequent reaction or dilution is required to convert the matrix material to the intermetallic.

The invention further relates to a process for forming composite materials comprising one or more second phase materials in an intermetallic containing matrix material, such as an aluminide, by providing a substantially molten mass containing the intermetallic or precursors thereof and then adding at least one of the constituents or elements of the desired second phase ceramic material to the molten mass, thereby initiating the solvent assisted in-situ precipitation reaction, to form and disperse finely divided particles of the second phase material in the matrix material.

The invention also relates to a process for forming intermetallic matrix composite materials comprising precipitating at least one second phase material by contacting reactive second phase forming constituents, in the presence of a solvent matrix material comprising an intermetallic or precursors thereof in which said constituents are more soluble than said second phase, at a temperature at which sufficient diffusion of said constituents into said solvent matrix material occurs to initiate the reaction of said constituents to produce a material comprising finely divided particles of the second phase material in a matrix material containing an intermetallic or a precursor thereof, and then introducing the thus produced composite material into either a molten metal, or a molten intermetallic containing material, wherein said molten metal is at least partially converted to an intermetallic compound or a mixture of intermetallic compounds.

DESCRIPTION OF PREFERRED EMBODIMENTS

Figure 1:
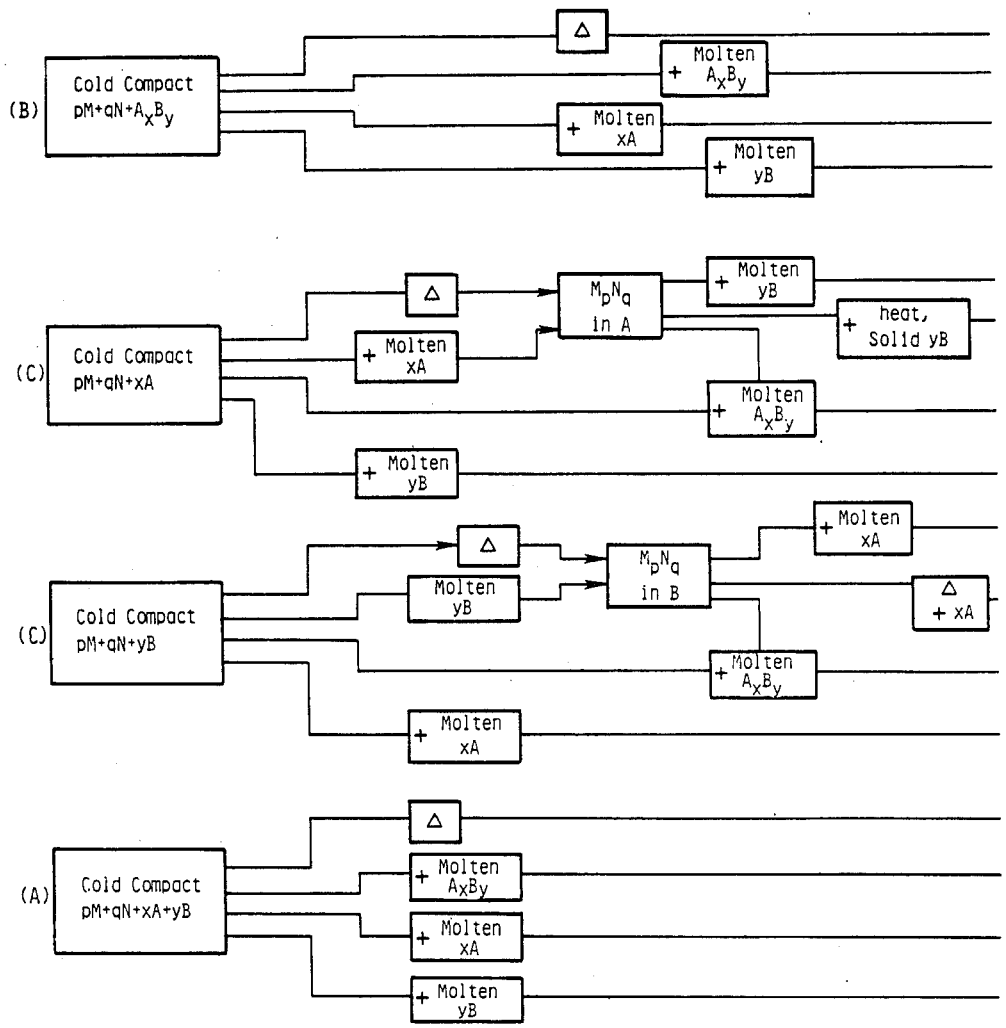
FIG. 1 represents a schematic presentation of some of the various reaction modes and states which may be used with this invention.

As was mentioned previously, the present invention relates to a process for the in-situ precipitation of fine particulate ceramics or other second phases, such as refractory hard metal borides and intermetallic dispersoids within intermetallic systems or precursors thereof, to recover an intermetallic-second phase composite having enhanced mechanical properties, such as high elastic modulus, high-temperature stability, ductility, and improved wear resistance. However, the process described may also be employed for producing larger particles of the second phase material in the chosen intermetallic containing matrix, up to the point at which such larger particles result in component embrittlement, or loss of ductility, etc. The enhanced mechanical properties offer weight-savings in stiffness limited applications, higher operating temperatures and associated energy efficiency improvements, and reduced wear in parts subject to erosion. Of particular importance in the case of intermetallics is the property of fine grain size which imparts greater ductility to these materials than heretofore attainable with intermetallics processed by prior art techniques. While the grain size of the intermetallic matrix of composites of the present invention may be from 0.01 to 10 microns or larger, the preferred grain size range is from 0.01 to 5 microns, and the most preferred range is from 0.01 to 1 micron. A specific application of such materials is in the construction of structural components capable of high temperature service, such as turbine blades.

Broadly stated, the present invention constitutes a process whereby elements forming a second phase precipitate react in a solvent matrix material containing an intermetallic, or at least one precursor thereof, to form a finely-divided dispersion of the second phase material in the solvent matrix material. In the case of aluminum-ceramic reinforced composites, it has been found that the reaction commences, or is initiated, at a temperature far below the temperature conventionally required for the reaction sought absent the solvent matrix material. While ceramic materials constitute the preferred second phase for dispersion as a fine precipitate in the intermetallic matrix, it is also possible to precipitate an intermetallic material as the second phase dispersoid in the intermetallic matrix. In such instances, the precipitate and matrix must be of different intermetallic composition. While the discussion herein shall focus upon ceramic materials as the second phase, or dispersoid, it must be borne in mind that intermetallic second phases are also to be included in the scope of the present invention. The second phase-forming constituents most easily combine at or about the melting temperature of the solvent matrix material, and the exothermic nature of this reaction may cause a very rapid temperature elevation or spike, which has the effect of melting additional matrix material, simultaneously causing the further reaction of the second phase-forming constituents.

In practicing this process, particularly for modulus limited applications, it is generally advisable to produce a composite material containing at least about 10 volume percent, preferably about 15 volume percent, second phase material, so as to yield a composite having appreciably improved properties in this regard. If grain refining alone is desired, lower levels of second phase material are adequate. Best results appear to be achieved when the concentration of the second phase in the produced composite material is great enough that the interparticle spacing is one micron or less. The composite may comprise up to about 95 volume percent dispersoid, where further dilution of composite by the addition thereof to an intermetallic or other metal melt is contemplated. In general, the composite may comprise from about 0.5 volume percent to about 25 volume percent dispersoid, with from about 1 percent to about 10 volume percent dispersoid preferred for control of matrix grain size.

Exemplary of suitable second phase precipitates are the borides, carbides, oxides, nitrides, silicides, oxynitrides, sulfides, and oxysulfides. Suitable elements include all of the elements which are reactive to form ceramic precipitates, including, but not limited to, transition elements of the third to sixth groups of the Periodic Table. Particularly useful ceramic phase forming constituents include aluminum, titanium, silicon, boron, carbon, oxygen, nitrogen, sulfur, molybdenum, tungsten, niobium, vanadium, zirconium, chromium, hafnium, cobalt, nickel, iron, magnesium, tantalum, manganese, zinc, lithium, beryllium, thorium, and the rare earth elements including scandium, yttrium, lanthanum and the lanthanide series elements such as cerium and erbium. Reactive compounds of such elements, such as $B_2O_3$, and $B_4C$, and $BN$ may also be used.

It is especially to be noted that plural dispersoids, and/or complex compounds such as titanium zirconium boride, may advantageously be precipitated in-situ in the intermetallic matrix. For example, composites of relatively low oxygen content may be produced by incorporation of small amounts (e.g., up to about 5 percent, dependent upon oxygen content of the matrix) of strong oxide formers, such as yttrium or any of the rare-earth metals, e.g., cerium and erbium, which will scavenge oxygen from the solvent matrix material. The exothermic temperature rise of the reaction mass, in conjunction with the increased surface area of the dispersoid formed, may effectively improve scavenging capability. The oxide particles thus formed enhance matrix ductility by removal of interstitial oxygen, and may also serve to dispersion strengthen the matrix and reduce grain size therein, in turn further enhancing matrix ductility. Further, it is to be noted that in many intermetallic-ceramic composites prepared by the method of the present invention, intermetallic precursors will also react with ceramic constituents to form additional ceramic dispersoids.

As the matrix or solvent, one may use any intermetallic, or precursors thereof capable of dissolving or at least sparingly dissolving the constituents forming the ceramic or other second phase, and having a lesser capability for dissolving or otherwise reacting with the formed ceramic or other second phase precipitate. Thus, at the temperatures experienced during the process, the matrix component must act as a solvent for the second phase reaction species, but not for the desired second phase precipitate. It is especially to be noted that the initial matrix acts primarily as a solvent in the process, and that the constituents of the second phase precipitate have a greater affinity for each other than either has for the solvent matrix material. It is further to be noted that the intermetallic precursors may individually, or collectively, act as solvent materials for the ceramic or second phase precursor materials. Thus, the ceramic or other second phase precursors, but not the ceramic or second phase itself, must be soluble in at least one of the intermetallic precursors or the intermetallic compound itself. Additionally, it is important that the exothermici of the second phase forming reaction be sufficient to sustain the reaction of the second phase precursors and allow it to go to substantial completion by consuming the reactants. Therefore, while the potential choice of second phase dispersoids and matrix materials is large, this choice is limited by adherence to the criteria hereinabove recited.

The solvent metal precursors for the intermetallic matrix may be selected from the group consisting of aluminum, nickel, copper, titanium, cobalt, iron, platinum, gold, silver, niobium, tantalum, boron, zinc, molybdenum, yttrium, hafnium, tin, tungsten, lithium, magnesium, beryllium, thorium, silicon, chromium, vanadium, zirconium, manganese, scandium, lanthanum, and rare earth elements and alloys thereof. Preferred intermetallic precursors include aluminum, nickel, titanium, cobalt, iron, and refractory metals. Plural intermetallic materials may, of course, be present in the matrix. It is noted that the terms intermetallic containing matrix, or intermetallic matrix, as used herein, are meant to define a matrix which is predominantly intermetallic, although other materials, e.g., metal intermetallic precursors, may also be present in lesser amount.

Intermetallics are suitable in the present invention for both the matrix, and optionally the second phase dispersoid. In such instance, the intermetallic dispersoid may be prepared from the preceding group of intermetallic matrix precursors, with the exception of copper, gold, silver, and platinum. These materials are generally considered as compounds of two or more metals in substantially stoichiometric proportions which do not necessarily follow normal ionic/covalent bonding type valence rules.

Intermetallics generally can be defined as phases or compounds of the general formula $A_xB_y$, wherein A is a metallic element, B is another metallic element (aluminum in the case of aluminides) and x and y closely approximate integers indicating that the compounds are a combination of two metals in defined molecular proportions. Among the metallic elements capable of forming aluminides are titanium, nickel, iron, cobalt, and refractory metals such as niobium, zirconium, tantalum and the like. Titanium forms the aluminides $Ti_3Al$, $TiAl$, and $Al_3Ti$, while nickel forms $Ni_3Al$ and $NiAl$. Other aluminides include $Zr_3Al$, $Co_3Al$ and $Fe_3Al$. For the purposes of the present invention, the aluminides of titanium and nickel are presently preferred. Substitution of one or more elements within an intermetallic compound is possible, and may be desirable to effect crystal lattice changes. Exemplary is the substitution of aluminum by titanium in $Ni_3Al$ to form $Ni_3(Al, Ti)$. In addition, two phase mixtures such as $TiAl$ and $Ti_3Al$ are suitable.

It should be recognized that aluminides are not necessarily of a composition such that x and y of the above formula are exact integers. For example, nickel aluminide is commonly referred to as $Ni_3Al$ although it is an intermetallic phase and not a simple ionic or covalently bonded compound, as it exists over a range of compositions as a function of temperature, e.g., about 72.5 to 77 weight percent nickel (85.1 to 87.8 atomic percent) at about 600° C. Thus, aluminides, and intermetallics generally, may be defined as the compounds which form upon solidification of near stoichiometric amounts of the appropriate metals. In the molten state, however, the intermetallics exist primarily as a random mixture of the elements thereof, possessing only relatively short range order. Within the scope of the present invention, this random mixture, or intermetallic derived liquid, may act as a solvent matrix material through which the solvent assisted reaction of second phase precursors occurs. This molten state may thus be referred to as an "intermetallic derived solvent", or "solvent matrix material" which terms also encompass the molten state of one or more precursors of said intermetallic.

With reference to composites with an aluminide containing matrix made by the methods of the present invention, such composites tend to have a higher ductility than even those aluminides produced by state-of-the-art processing routes absent dispersoids. The aluminide composites are also characterized by fine grain size, which is thought to increase the ambient temperature ductility by reducing dislocation stress at grain boundaries as a result of reduced slip length. The composites also exhibit a higher temperature capability, lower creep, and increased modulus and hardness.

It is known that the intermetallics may deform by a number of mechanisms, such as movement of dislocations, superdislocations, twinning, and the like. In the particular case of the intermetallic compound TiAl, the lattice structure has an aspect ratio of 1.02, i.e., the structure is nearly cubic. In this condition this structure may deform by any of the aforementioned mechanisms.

The ambient temperature ductility of this material is determined by the ease of the dislocation movement and it is therefore desirable to maximize the number of operating slip systems to achieve the most ductile material. From a statistical point of view, it is known that a reduction in the grain size of the intermetallic matrix will make available a larger number of suitably oriented grains for dislocation activity, an effective means of improving ductility.

A further means of increasing the number of available slip systems is the attainment of a cubic structure, i.e., aspect ratio of 1.0. This may be achieved by such means as alloying, radiation damage, and the like, such that the lattice is expanded in the shorter direction. The choice of suitable alloying additions will be governed both by the size of the atomic nuclei and the electronic band structure of the alloying elements. Examples where modification of the lattice parameter of an intermetallic by alloying is possible is the case of substitution of Al by Ti in $Ni_3Al$ to form $Ni_3(Al,Ti)$.

The combination of any of the above mechanisms for increasing the deformation capabilities of intermetallics is considered a powerful means of achieving enhanced ambient temperature ductility. When this is combined with the dispersion strengthening and high-temperature capability afforded by the techniques disclosed herein, a unique series of composite materials is achievable which can satisfy both low temperature ductility concerns and also high temperature strength requirements.

For the purpose of illustrating the various reaction modes that may be used to form a second phase dispersion within an intermetallic matrix, detailed consideration will be given only to the specific case of intermetallic-ceramic composites. In this discussion, it is understood that multiple dispersoids, intermetallic dispersoids, and/or multiple intermetallic matrices are also intended to be included. Methods of preparation of the intermetallic-ceramic composites of the present invention include the following: (A) coformation of the intermetallic and ceramic by inclusion of appropriate amounts of starting ingredients, in elemental form, so as to ultimately provide essentially stoichiometric proportions of the constituents of the intermetallic and ceramic, in a reaction vessel; (B) use of previously formed intermetallic material as a solid, followed by an in-situ precipitation of the ceramic material therein in a separate stage; (C) preparation of a master concentrate of the ceramic phase dispersoid in one or more metals or alloys that do not form intermetallics with themselves, which metals are convertible to form the desired intermetallic, followed by dilution of said concentrate in an intermetallic, or in further metals or alloys with which the matrix material of the concentrate is reactive to form intermetallics; (D) direct addition of one or more ceramic forming precursor materials in the presence of an intermetallic derived solvent material to a melt comprising an intermetallic derived solvent and the complementary ceramic precursor(s) to generate an in-situ ceramic dispersoid forming reaction in the intermetallic derived solvent; and, (E) direct addition of one or more ceramic forming precursors and an intermetallic precursor to a melt containing one or more metals or alloys with which said intermetallic precursor is reactive to form intermetallics, and with which said ceramic forming precursor is reactive to form the ceramic dispersoid.

As can be appreciated, a vast number of reaction sequences can be envisioned as being within the scope of the present invention. A representative number of such sequences are set forth in FIG. 1, although this schematic representation should not be taken as limiting the scope of the present invention.

It is also recognized, moreover, that intermetallic-ceramic composites made by any of the methods described may be subjected to dilution or to addition to melts of intermetallics or other matrix materials in which they are soluble, to achieve specific goals and purposes. For sake of clarity, however, this procedure is not set forth in FIG. 1.

In the above-mentioned coformation process, (A), the starting materials constitute individual powders of each of the ceramic precursors and the intermetallic precursors. Thus, one may react a mixture of aluminum, nickel, titanium, and boron, to form a dispersion of titanium diboride in a nickel aluminide matrix. In this process, the basic reaction mode may be written as

$$pM + qN + xA + yB \rightarrow M_pN_q + A_xB_y, \qquad (I)$$

wherein M and N represent ceramic precursor materials, A and B are metallic elements constituting precursors of an intermetallic compound, and p,q,x and y closely approximate integers. In the specific example given, the formation of titanium diboride in a matrix of nickel aluminide, M is titanium, N is boron, A is nickel, B is aluminum, p is 1, q is 2, y is 1, and x may be 1 or 3, depending on which nickel aluminide, (NiAl or $Ni_3Al$) is desired.

In this process, the intermetallic constituting the matrix material of the subject composite may be formed prior to, essentially simultaneously with, or after the in-situ precipitation of the ceramic dispersoid. In practicing this coformation process, it has been found that the nature and amount of the intermetallic and ceramic phase may be controlled by appropriate choice of the stoichiometry of the initial ingredients added. Thus, for example, a preponderance of $Ni_3Al$ or NiAl may be formed by correctly proportioning the relative amounts of the starting ingredients, taking into account any of the ingredients consumed by ceramic forming reactions, and losses due to absorption into the walls of the reaction vessel, extraneous compound formation, volatilization, etc. In this regard, it should be noted that the ceramic forming constituents must have a greater affinity for each other than for any of the intermetallic forming materials. Clearly, this only applies up to the stoichiometric limit of the ceramic forming reaction, since beyond this point, any excess of metallic ceramic forming constituent present will be available to form intermetallics. In many instances, the selection of the particular ceramic dispersoid and the particular intermetallic for the composite may dictate the sequence in which the components are formed. For example, when preparing an aluminide composite where the ceramic and aluminide are formed in one operation, the aluminide may form at a lower reaction temperature and thus will be formed first. On the other hand, the ceramic may form at a lower temperature and the aluminide form thereafter at a higher reaction temperature. In the first instance, wherein the aluminide is formed first, the ceramic precursors are soluble in the molten aluminide, and precipitate upon initiation of the ceramic-forming exothermic reaction. In the second instance, wherein the ceramic-forming reaction is initiated at a lower temperature, the exothermic reaction liberates sufficient energy to raise the temperature of the reaction mass to the point at which the intermetallic precursors combine. Obviously, it is possible for the temperature to rise sufficiently in some cases for both reactions to occur essentially simultaneously.

In method (B) set forth above, one may use a previously prepared intermetallic, and thereafter add the necessary materials to form the desired ceramic to a melt of the intermetallic. The basic reaction mode contemplated herein constitutes the following two-step procedure, wherein formula II represents the initial preparation of the intermetallic.

$$xA + yB \rightarrow A_xB_y \quad \text{(II)}$$

$$A_xB_y + pM + qN \rightarrow M_pN_q \text{ in } A_xB_y \quad \text{(III)}$$

In a sense, this reaction mode may be considered a sub-set of Formula I, wherein the intermetallic forms prior to the ceramic dispersoid. In the formation of titanium carbide in nickel aluminide, A is nickel, B is aluminum, M is titanium, N is carbon, P is 1, q is 1, y is 1, and x may be 1 or 3 dependent upon the aluminide desired.

In the ceramic master concentrate method (C), one forms a "master alloy" of ceramic dispersoid in a metal matrix, which matrix is subsequently converted to the desired intermetallic. The first stage of this two-stage reaction made may be exemplified as:

$$pM + qN + xA \rightarrow M_pN_q + xA \quad \text{(IVa)}$$

or $$pM + qN + yB \rightarrow M_pN_q + yB \quad \text{(IVb)}$$

The reaction products of Formula IV may then be processed in accordance with Formula V, as follows:

$$(M_pN_q + xA) + yB \rightarrow M_pN_q + A_xB_y \quad \text{(Va)}$$

or $$(M_pN_q + yB) + xA \rightarrow M_pN_q + A_xB_y \quad \text{(Vb)}$$

Alternatively, the "master alloy" of Formula IVa may be diluted in an intermetallic, so as to achieve a dispersion of ceramic in a matrix consisting of mixed metal and intermetallic phases, or, in a matrix comprising an intermetallic other than the diluent.

$$(M_pN_q + xA) + A_{x'}B_{y'} \rightarrow M_pN_q + A_{x'}B_{y'} + xA \quad \text{(Vc)}$$

$$(M_pN_q + yB) + A_{x'}B_{y'} \rightarrow M_pN_q + A_{x'}B_{y'} + yB \quad \text{(Vd)}$$

$$(M_pN_q + xA) + A_{x'}B_y \rightarrow M_pN_q + A_{x+x'}B_y \quad \text{(Ve)}$$

$$(M_pN_q + yB) + A_xB_{y'} \rightarrow M_pN_q + A_xB_{y+y'} \quad \text{(Vf)}$$

This latter approach permits the preparation of such composites as TiB$_2$ dispersed in Ni$_3$Al, by the reaction sequence:

$$Ti + 2B + Ni \rightarrow TiB_2 + Ni$$

$$2(TiB_2 + Ni) + NiAl \rightarrow 2TiB_2 + Ni_3Al$$

Obviously, this sequence mode is permissive of a great number of variants, enabling one to achieve a great variety of results utilizing such procedures. Thus it is possible to prepare "Master Concentrates", containing a ceramic phase, which may be utilized to introduce the ceramic phase to a specified diluent in controlled fashion. Thus, for example, one may prepare a master alloy of a high percentage of titanium diboride in an aluminide, and add metal or additional aluminide to achieve a composite having the desired composition.

The fourth reaction mode contemplated by this invention, method (D), envisions the direct addition of a ceramic forming precursor material, in the presence of a minor proportion of an intermetallic derived solvent, to a melt of the intermetallic phase and the complementary ceramic precursor.

$$M_p + (N_q + A_xB_y) \rightarrow M_pN_q + A_xB_y \quad \text{(VIa)}$$

$$N_q + (M_p + A_xB_y) \rightarrow M_pN_q + A_xB_y \quad \text{(VIIb)}$$

Another reaction method considered appropriate is the method identified hereinabove as method (E), wherein one or more ceramic precursors are admixed or alloyed with an intermetallic precursor, and added to a melt containing the necessary ceramic and intermetallic precursors to react to form the desired material:

$$(pM + xA) + (qN + yB) \rightarrow M_pN_q + A_xyB \quad \text{(VIIa)}$$

$$(pM + yB) + (qN + xA) \rightarrow M_pN_q + A_xB_y \quad \text{(VIIb)}$$

$$(pM + xA + x'A) + (qN + yB + y'B) \rightarrow M_pN_q + A_xB_y + A_{x'}B_{y'} \quad \text{(VIIc)}$$

$$(pM + qN + xA + x'A) + yB + y'B \rightarrow M_pN_q + A_xB_y + A_{x'}B_{y'} \quad \text{(VIId)}$$

The method exemplified by Formulae VIIc and VIId illustrate the preparation of an intermetallic-ceramic composite in which the matrix is a mixture of two differing intermetallic materials. The method exemplified by Formulae VIIa and VIIb may be likened to the alloy-alloy method set forth in patent application Ser. No. 662,928, filed Oct. 19, 1984, of which this is a continuation-in-part, and which is incorporated herein by reference. Similarly, the general concept of the solvent assisted reaction of ceramic forming precursors is set forth in said patent application.

Varying amounts of ceramic may be incorporated into the composite material, depending upon the end use and the properties desired in the product. As previously noted, for dispersion strengthened materials having high modulus, one may utilize a preferred range of from about 10 percent by volume to about 25 percent by volume. However, the ceramic volume fraction may be varied considerably, so as to produce a composite with the desired combination of properties, within the range of from about 0.5 percent by volume up to the point at which ductility is sacrificed to an unacceptable extent. In contrast, cermet-like composites of up to about 95 percent or more by volume of ceramic material in the aluminide containing matrix may be produced. Preferred ranges for such materials will, of course, be dependent upon the desired end use. It is possible to effectively tailor the composition to achieve a spectrum of properties by controlling the proportions of the reactant and solvent materials.

Moreover, the various reaction modes may be initiated in different physical states. Thus, the elemental powders can initiate the process in a plasma arc or flame, or via diffusion of the reactive species through the liquid solvent, or, in cases where solid phase diffusion is rapid, in a solid state. In the case where two alloys are used, each containing an alloying element constituting a reactive component, the reaction can also occur in the solid state, liquid state, gaseous or in a plasma arc or flame achieved, for example, by striking an arc between electrodes of the two alloys.

As was previously stated, the present invention provides for the formation of one or more finely dispersed precipitates in a matrix of one or more intermetallic containing materials. It is important that the second phase precipitate material is not soluble in, or reactive with, the intermetallic derived solvent, while the constituents of the second phase, individually, are at least sparingly soluble in the intermetallic derived solvent. Thus, the exothermic dispersion reaction mechanism depends upon a certain amount of each second phase forming constituent dissolving and diffusing in the intermetallic derived solvent, and while in solution (either liquid or solid state), reacting exothermically to form the insoluble precipitate rapidly as a very fine particulate. The intermetallic derived solvent or solvent matrix material provides a medium in which the reactive elements may diffuse and combine. Once the initial reaction has occurred, the heat released by the exothermic reaction causes additional diffusion of reactive components in the solvent matrix material, and allows the reaction to proceed. During the initiation and reaction extremely high temperatures may be achieved in very short periods of time. During this time frame, essentially all of the reactive constituents in the solvent, metal react to form the insoluble second phase, which immediately precipitates.

The cool-down period following initiation of the reaction and consumption of the reactive constituents may be important in achieving very small dispersoid size, and limiting dispersoid growth. It is known that at high temperatures, it is possible for the second phase particles to grow, e.g., by dissolution/precipitation or by agglomeration. This should be avoided, because of the negative effect of large particle sizes on ductility. The cool-down or quenching of the reaction is, in a sense, automatic, since once the second phase-forming constituents are completely reacted, there is no further energy released to maintain the high temperatures achieved. However, one may control the rate of cool-down to a certain extent by controlling the size and/or composition of the mass of material reacted. That is, large thermal masses absorb energy, and cool down more slowly, thus permitting growth of larger particles, such as may be desired for greater wear resistance, e.g., for use in cutting tools. Thus, the temperature may be reduced from the maximum temperature attained to a temperature where grain growth is minimal. The incidence of particle growth will depend on the particular second phase being formed.

The reaction initiation temperature has generally been found to be relatively close to the melting temperature of the solvent matrix material utilized in liquid state reactions. For example, in the production of titanium diboride in a titanium aluminide from the elemental powders, the reaction proceeds at a temperature around 660° C., near the melting point of aluminum. It should be noted that in the absence of a solvent matrix material, the reaction of titanium and boron to form titanium diboride was not observed to proceed below a temperature of about 900° C., and frequently did not go to completion, and there was essentially no control over the particle size of the final product. While one need not actually reach the melting temperature initially, one must achieve a temperature where substantial diffusion of the reactive species in the solvent matrix material can occur, either locally or generally. It is also observed that, in some cases, as one increases the temperature it is possible for one of the starting constituents to diffuse into a solvent matrix material, forming an alloy therewith having a lower melting temperature than the matrix intermetallic, and thus lowering the reaction initiation temperature.

It is also to be noted that with the basic process, one may cause the complex precipitation of a plurality of systems. Thus, it is possible to precipitate complex phases, such as $Ti(B_{0.5}C_{0.5})$, or alternatively, to precipitate a mixture of titanium diboride and zirconium diboride in an aluminide containing matrix.

It has been found that the powders need not be compacted prior to firing, but doing so allows easier diffusion and thus initiation at lower temperatures. For instance, loose powder mixtures of aluminum, titanium and boron tend to react at slightly higher temperatures than highly compacted powders. This is due to localized melting, and increased diffusion, which are possible when the powders are in close proximity. In addition, compaction is advantageous because the compact may be handled as a free-standing body requiring no containment vessel that can generate contaminants in the system and can be destroyed by the thermal shock of the reaction. The impurity issue is especially important when an oxide refractory containment vessel such as zirconia is used in processing materials containing titanium which are particularly susceptible to effects such as oxygen embrittlement.

Porosity of the final composite can be minimized by a vacuum degassing operation prior to initiation of the reaction. The degree of vacumm applied and temperature of the degassing step is determined purely by the kinetics of evaporation and diffusion of any absorbed moisture or other gasses. High vacuum and elevated temperatures aid the degassing operation.

During heat up, the starting powders should be protected from extensive oxidation due to exposure to the atmosphere, as this will restrict the diffusion of the components into the solvent matrix material, and the reaction should preferably be carried out under an inert gas to avoid oxidation at high temperatures. Further, this reduces the loss of reactant or solvent species as volatile oxides or other oxidized species.

The particle size of the powders utilized in the elemental powder mode does not appear to be critical. It has been found, however, that particle size of the second phase reaction product can depend upon such factors as heat-up rate, reaction temperature, cool-down rate, and crystallinity and composition of the starting materials. Appropriate powder sizes may range from less than 5 microns to more than 200 microns to facilitate mixing procedures and provide sufficiently small diffusion distances. For economic reasons, one normally may utilize the larger particle size powders. It has been found that the particle size of the precipitated second phase in the matrix may vary from less than about 0.01 microns to about 5 microns or larger, dependent upon such factors as cited above.

As was mentioned previously, one embodiment of the subject process for forming intermetallic-second phase composite materials comprises providing a substantially molten or liquid mass containing the solvent matrix material, and then adding at least one of the constituents or elements of the desired second phase material with a minor proportion of compatible solvent material, to the molten mass. Upon the addition, the solvent assisted in-situ precipitation reaction is initiated to form and disperse finely divided particles of second phase material in the matrix. Thus, for example, the molten mass could contain one of the constituents of the desired second phase material, e.g., as preformed alloy, and one or more constituents would subsequently be added. Alternatively, all of the constituents could be added to the molten mass either sequentially or simultaneously. One convenient mode of practicing this process is to compact powders or chips of the unreacted constituents of the second phase material with a minor proportion of compatible solvent material, and then add the compact of constituents to the molten metal mass.

The constituent or constituents are added to the molten metal mass along with sufficient solvent metal to allow the reaction to easily proceed. With this procedure, the metal of the molten mass could be different than the added solvent metal and thus need not be a solvent for the constituents. As above, this process allows for two or more metals in the matrix phase which may then be converted to one or more intermetallic phases by suitable heat treatment. In any such process, however, care must be taken that the diluent metal is not reactive with the second phase or its constituents.

In this preferred addition process, it is generally preferable that the amount of each constituent added is such that essentially all of the second phase-forming constituents are consumed in the precipitation reaction, i.e., that essentially no unreacted second phase forming constituent remains after the completion of the reaction. In most instances, this requirement can be met if stoichiometric quantities of the constituents are present in the final molten mass of matrix metal just prior to solidification. In some cases, however, an excess of one component beyond stoichiometric may be desirable, e.g., excess boron in the preparation of $TiB_2$ in $Ni_3Al$. Clearly, this stipulation is modified if one or more of the second phase-forming constituents is a metal that is also reactive in forming the desired intermetallic matrix. The amounts of the ingredients must then be proportioned according to the combined stoichiometry of the required second phase precipitate and the intermetallic matrix phase.

In selecting the constituents and the matrix for the composite materials produced by the above-described addition process, it is important that the formed second phase material have low solubility in the molten mass. Otherwise, significant particle growth of the second phase material may be experienced over extended periods of time at temperature. For most applications of the composite materials, the size of the second phase particles should be as small as possible, and thus particle growth is undesirable. When the solubility of the formed second phase material in the molten mass is low, the molten mass with dispersed second phase particles can be maintained in the molten state for a considerable period of time without growth of the second phase particles.

An advantage of this embodiment is that, if the constituents are added in a step-wise or incremental fashion, the bulk temperature of the molten mass will not change significantly during the course of the addition, i.e., the large temperature spike associated with reaction initiation and progress and thus potential particle growth of the second phase particles due to elevated temperatures will be localized to the reaction zone, and rapidly quenched by the surrounding reaction mass, which acts essentially as an isothermal heat sink. Such an addition procedure is also advisable from a safety standpoint to prevent the rapid evolution of significant quantities of heat which could cause metal to be splattered or sprayed from the containment vessel. Another advantage is that the agitation due to energy release and to temperature gradients caused by the exothermic reaction of the constituents in forming the second phase material occurring in the molten mass creates a mixing effect and thus aids in dispersing the second phase material throughout the mass. In addition, by having the mass in the molten or liquid state upon addition of the constituents, the constituents are rapidly heated to reaction temperature, thus promoting the formation of fine particles. A further important consideration of this process is that since a molten mass of matrix metal is utilized, the matrix metal need not be formed from powdered metal, a significant saving in material preparation costs.

As was also previously mentioned, one can prepare master concentrates of the subject composite materials and thereafter dilute the concentrate to yield the desired composite material. Generally, the concentrate formation comprises initially preparing a reactant mixture of second phase forming constituents and then heating to produce the in-situ reaction as described herein to form fine particles of second phase material dispersed in the matrix. Alternatively, the initial metal-second phase composite can be formed by the previously described process of adding the constituents directly to a molten mass of matrix metal. The concentration or loading of second phase material is generally rather high, e.g., at least 10 volume percent, preferably 15 percent, up to 80 or 90 volume percent or more of second phase material in the resultant composite. Generally, concentrations below about 10 volume percent are not economical for further dilution, and concentrations in excess of about 90 volume percent are not advisable as the reaction may become too violent and particle growth may be experienced. After solidification, preferably the composite is comminuted to a desired size, or alternatively, the composite can be cast to any appropriate size.

The next step in the master concentrate process is dilution of the concentrate by additional matrix material which can be the same or different from the intermetallic forming material used in the in-situ precipitation reaction. In one embodiment, the diluting metal may be selected such that it forms one or more intermetallic phases with the original matrix metal in which the precipitation reaction took place. Generally, this dilution may be accomplished by preparing a melt of the additional matrix material and adding the composite to the melt, or alternatively, placing both the composite material and the additional matrix material in solid form in a vessel and then heating to a temperature such that the additional matrix material melts. Dispersion of the second phase material in the melt is facilitated by melt agitation generated by arc melting, mechanical stirring, induction stirring, gas bubbling, ultrasonics, and the like. While in the molten state, various clean-up techniques such as the use of deoxidants, scavengers and the like can be employed to remove impurities such as oxygen from the matrix phase. Particularly advantageous embodiments include the use of oxygen scavengers such as yttrium or erbium in titanium melts, thereby improving the scavenging of oxygen, and forming additional finely dispersed oxides in the matrix. Once dispersion of the second phase material is complete, the melt may be solidified by conventional techniques such as chill casting to yield very low porosity composites.

In preparing such master concentrates, degassing of the powders of the initial reactant mixture may not be necessary, and in fact it may be advantageous, from a processing standpoint, not to degas the powders, since a porous product tends to be formed which aids in the subsequent dilution by molten material. It even may be desirable in some instances to incorporate a porosity enhancer such as a low boiling point metal, e.g., magnesium, in the initial reactant mixture, the enhancer volatilizing during the in-situ reaction, thereby increasing the porosity of the resultant composite. Use of hydrides may be particularly advantageous in this context since the hydrogen generated upon decomposition of the compound generates porosity and may be useful in reducing absorbed oxygen in the system.

The use of master concentrates, particularly those having high loadings of second phase material, is advantageous since one can simply make one batch of composite material and make a wide variety of differing composites having different dispersoid loadings. Another advantage is that the additional matrix material used to form the melt need not be in powder form, thereby saving considerably on raw material preparation costs. Additionally, with the master concentrate procedure, it is possible to form the second phase material in a matrix material which is, for example, conducive to the formation of particles of a desired size, type, morphology, etc. and thereafter incorporate the particles in a compatible matrix material in which such particles cannot be produced by the in-situ precipitation reaction.

The following examples illustrate the precipitation of fine particles of a dispersoid to produce a composite having an aluminide containing matrix.

EXAMPLE 1

Figures 1, 2:
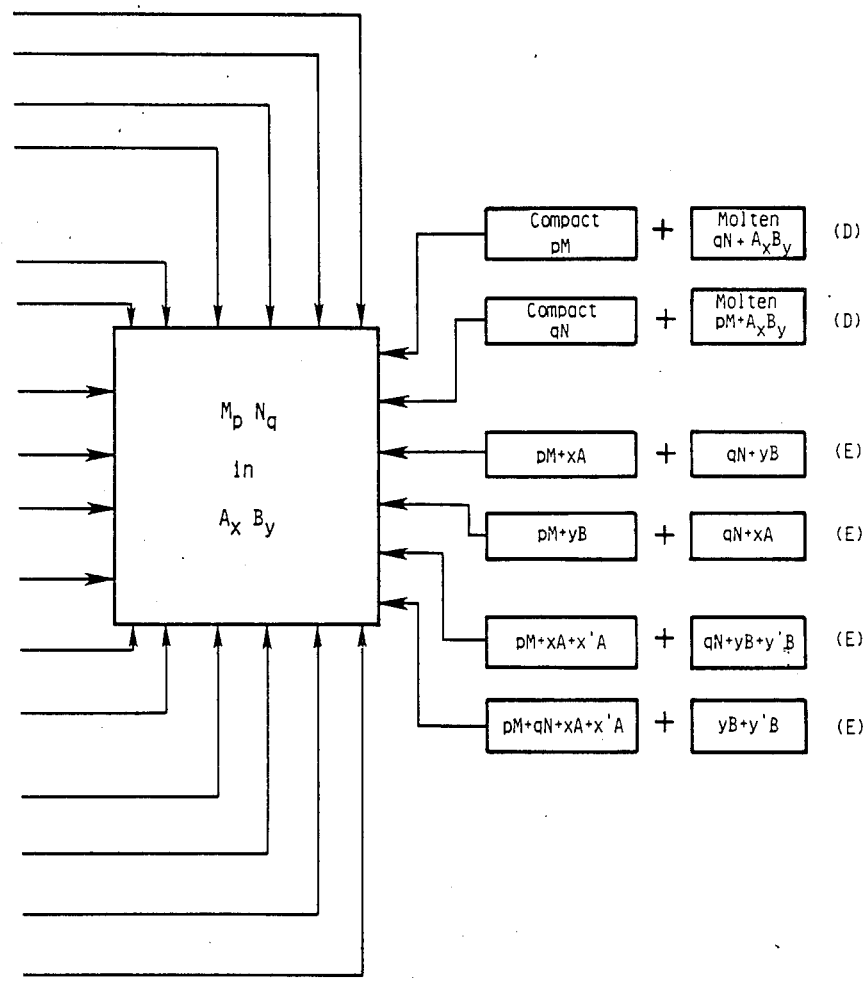
FIG. 2 is a photomicrograph of a dispersion of titanium diboride in a titanium aluminide ($Al_3Ti$) matrix.
Figure 2:
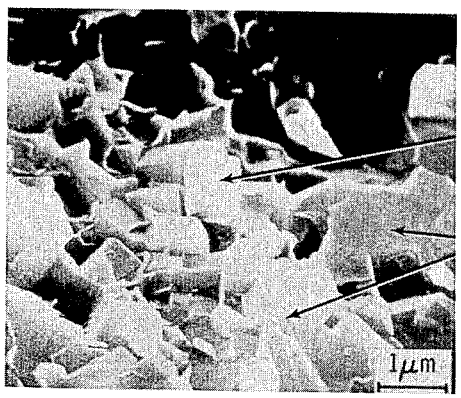
Figure 3:
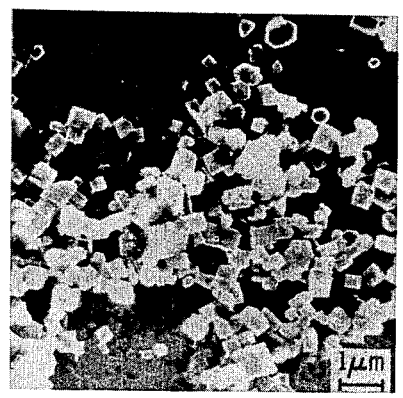
FIG. 3 is a photomicrograph of a dispersion of titanium diboride in a titanium aluminide ($Al_3Ti$) matrix after etching of the aluminide matrix.

An intermetallic-ceramic composite containing about 35 weight percent titanium diboride particles dispersed in a matrix of titanium aluminide ($Al_3Ti$) is prepared as follows. A well-blended mixture of 202.5 grams of aluminum, 239.5 grams of titanium and 55.7 grams of boron is made from powders of the respective elements and the mixture then isostatically compacted with a pressure of about 35,000 psi. The formed compact is heated in an inconel retort and a reaction initiated at about 660° C., causing melting of the compact. Upon removal from the retort, the compact is subjected to X-ray analysis which indicates the presence of $TiB_2$ and $Al_3Ti$ with only trace amounts of the initial elements. An SEM analysis indicates that the titanium diboride particles are submicron and dispersed in a titanium aluminide matrix as is shown in FIG. 2. A sample where a portion of the $Al_3Ti$ matrix has been etched away is shown in FIG. 3 and gives further indication as to the fine particle size and even dispersion of the titanium diboride. EDS analysis of the particles indicates that the particles are essentially pure titanium diboride.

EXAMPLE 2

Figure 4:
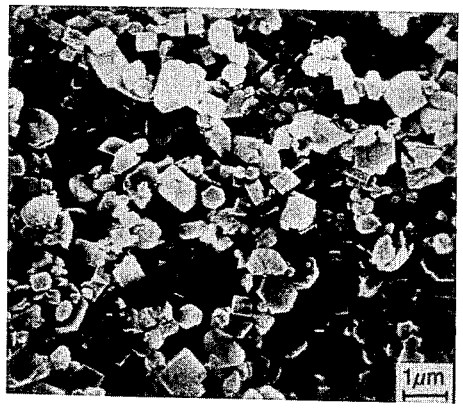
FIG. 4 is a photomicrograph of a dispersion of titanium diboride in titanium aluminide ($Ti_3Al$) matrix after etching of the aluminide matrix.

An intermetallic-ceramic composite of titanium diboride particles in a matrix of titanium aluminide ($Ti_3Al$) is prepared as follows. A mixture of 67.5 grams of aluminum, 359.2 grams of titanium and 55.7 grams of boron is thoroughly blended and the mixture then compacted and heated in the manner of Example 1. The reaction temperature is observed to be about 660° C. The resultant material upon solidification is a dispersion of fine particles of titanium diboride in a matrix of titanium aluminide ($Ti_3Al$), as is shown in the photomicrograph of FIG. 4.

EXAMPLE 3

Figure 5:
FIG. 5 is a photomicrograph of a dispersion of titanium diboride in titanium aluminide (TiAl) after etching of the aluminide matrix.

An intermetallic-ceramic composite containing 35 weight percent fine titanium diboride particles in a matrix of titanium aluminide (TiAl) is prepared as follows. A powdered mixture of about 117 grams powdered aluminum, about 328 grams titanium and about 56 grams of boron is prepared and mixed well to insure uniformity. The mixture is compacted and heated in the manner of Example 1 to yield a composite of fine titanium diboride particles in a matrix of TiAl as is shown in the photomicrograph of FIG. 5. Analysis of the composite also reveals a minor amount of $Ti_3Al$.

EXAMPLE 4

An intermetallic-ceramic composite of zirconium diboride particles dispersed in titanium aluminide ($Ti_3Al$) is prepared as follows. A mixture of 10.8 grams zirconium, 2.5 grams boron, 76.6 grams titanium and 13.8 grams aluminum is thoroughly blended and then processed in a manner similar to that of Example 1 to yield the composite.

EXAMPLE 5

Figure 6:
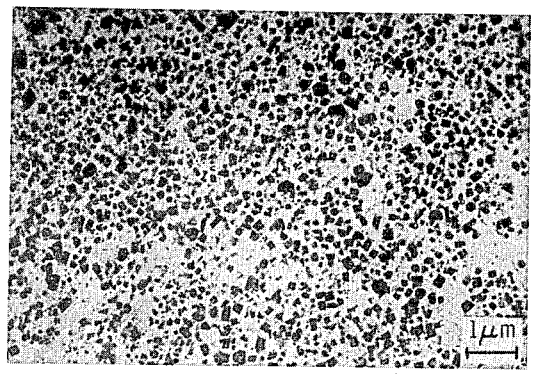
FIG. 6 is a photomicrograph of a dispersion of titanium diboride in nickel aluminide after etching of the aluminide matrix.

An intermetallic ceramic composite of zirconium diboride particles dispersed in a matrix of nickel aluminide ($Ni_3Al$) is prepared. Two mixtures, each containing 97 grams of zirconium, 23 grams of boron, 243 grams of nickel and 37.2 grams of aluminum are blended thoroughly. One mixture is heated to reaction initiation temperature in a resistance heated furnace, and the other heated to reaction initiation temperature by induction heating. The resultant composites each contain a small amount of unreacted nickel. When subjected to fracturing forces, these composites have a fracture surface which exhibits microvoid coalescence, which tends to indicate that the mode of fracture was a ductile one, consistent with the fine grain size of the aluminide matrix. The fracture surface is shown in the photomicrograph of FIG. 6.

EXAMPLE 6

A mixture of nickel, aluminum, titanium, and boron in the stoichiometric proportions for the formation of nickel aluminide ($Ni_3Al$) and titanium diboride ($TiB_2$), i.e., 10 percent by weight aluminum, 62 percent by weight nickel, 19 percent by weight titanium, and 9 percent by weight boron, is compacted to 40,000 pounds per square inch, and then heated in a furnace. Upon reaching 620° C., a rapid exotherm is noted, which subsequent analysis by X-ray diffraction and scanning electron microscopy identifies as resulting from the formation of titanium diboride particles in a nickel aluminide matrix. It is evident from this experiment that a ceramic phase, e.g., titanium diboride, could be directly preciitated in an intermetallic phase, e.g., nickel aluminide, provided the affinity of the ceramic-forming species for each other is greater than either has for the two elements making up the intermetallic matrix.

EXAMPLE 7

An intermetallic-ceramic composite of titanium diboride particles dispersed in a matrix of nickel aluminide ($Ni_3Al$) is prepared as follows. A mixture of 103.5 grams titanium, 46.5 grams boron, 302.5 grams nickel, and 47.5 grams aluminum is blended and then isostatically pressed. About 100 grams of the pressed compact is then reacted in a retort. From a temperature probe placed adjacent to, but not touching the compact, the reaction apparently occurs at about 807° C. and the temperature during reaction peaks at about 1050° C. X-ray diffraction of the resultant composite indicates the presence of $TiB_2$, $Ni_3Al$, and residual Ni.

EXAMPLE 8

In a series of experiments, the formation of each of the dispersoids hafnium carbide, zirconium carbide, titanium carbide, titanium boride, titanium diboride, and vanadium diboride in the matrices of titanium aluminide ($Ti_3Al$) and nickel aluminide ($Ni_3Al$) is investigated. In preparing the various composites, the constituents forming the ceramic dispersoid and the components forming the aluminide containing matrix are reacted at the same time. The constituents and components in the reacting mixture are combined in such proportions so as to yield an intermetallic matrix composite containing about 40 weight percent ceramic dispersoid. The reactions for each composite are conducted twice, one of the reactions being conducted under an argon atmosphere and the other under vacuum. Induction heating is used to initiate each reaction, and at the first indication of a reaction, power to the induction heating unit is terminated so that the composite may cool as quickly as possible.

Upon completion of the reaction, each of the formed ceramic-aluminide composites is examined by X-ray diffraction analysis to determine its composition. In addition, a small amount of the matrix is dissolved in acid and the ceramic particles are observed for particle size by a scanning electron microscope and also examined by X-ray diffraction to determine the particle composition.

The results of these observations are set forth in the following Table.

TABLE I

| Desired Compound Dispersoid/Matrix | Reacted Under Argon | | | Reacted Under Vacuum | | | |
|---|---|---|---|---|---|---|---|
| | Major Component | Minor Component | Particle Size | Major Component | Minor Component | Particle Size (micron) | Comment |
| HfC/$Ni_3Al$ | HfC, $Ni_3Al$, Ni | Hf, $Al_2Hf$ | 0.1–2 | HfC, $Ni_3Al$ Ni | Hf | 0.1–1.3 | Amount of $Al_2Hf$ was very small |
| HfC/$Ti_3Al$ | HfC, TiC $Ti_3Al$, Ti | $Ti_3AlC$ | 0.1–1.2 | HfC, TiC $Ti_3Al$, $AlTi_2$ | $Ti_3AlC$ | 0.5 | |
| $VB_2$/$Ni_3Al$ | $VB_2$, Ni, Al, $V_3B_4$ | — | 0.1–1.3 | $VB_2$, $Ni_3Al$, $V_3B_4$, Ni, Al | V | 1–2 | |
| $VB_2$/$Ti_3Al$ | $Ti_3Al$, $V_3V_4$ $Al_{11}V$, $Al_6V$ | V, $TiB_2$ | none | $Ti_3Al$, $Al_{11}V$ | $TiB_2$, $Al_6V$ | none | |
| TiC/$Ni_3Al$ | TiC, $Ni_3Al$ Ni | — | 0.1–2 | TiC, $Ni_3Al$, Ni | — | 0.1–1.5 | |
| TiC/$Ti_3Al$ | TiC, $Ti_3AlC$ | $Ti_3Al$ | 0.1–1.5 | TiC, $Ti_3AlC$ | — | 0.2–2 | |
| ZrC/$Ni_3Al$ | ZrC, $Ni_3Al$, $Ni_7Zr_2$ | $Ni_5Zr$ | 1 | ZrC, Zr, Ni, $Ni_3Al$ | — | 0.5 | Intermetallics of Ni and Zr are probably unstable phases |
| ZrC/$Ti_3Al$ | TiC, $Ti_3Al$, $Ti_3AlC$ | $AlZr_3$ | none | $Ti_3AlC$, TiC, $Al_2Zr$ | — | none | Did not form ZrC dispersoid, due to greater stability of TiC, $Ti_3AlC$ |
| TiB/$Ti_3Al$ (10 vol %) | $Ti_3Al$ | TiB | $Ti_2Al$ | — | — | — | |
| TiB/$Ti_3Al$ (30 vol %) | $Ti_3Al$ | TiB | $Ti_2Al$ | — | — | — | |
| TiB and TiC/ $Ti_3Al$ | TiC TiB $Ti_3Al$ | — | — | — | — | — | Using $B_4C$ as reactant |
| $TiB_2$/TiAl | TiAl | $TiB_2$ | — | — | — | — | |
| TiC/TiAl | TiC TiAl | $Ti_3Al$ $Ti_2Al$ | — | — | — | — | |

EXAMPLE 9

An intermetallic-ceramic composite having mixed ceramic dispersoids is prepared by mixing 11.0 grams of $Al_4C_3$, 33.8 grams of tantalum, and 135.2 grams of niobium, and heating in a graphite induction furnace. Analysis of the recovered product reveals the presence of both TaC and $Ta_2C$ in a matrix of $Nb_3Al$.

EXAMPLE 10

An intermetallic-ceramic composite comprising a ceramic dispersoid in a mixed intermetallic matrix is prepared by mixing 43.6 grams of titanium, 123.6 grams of tantalum, and 32.8 grams of $Al_4C$, compacting, and reacting on a water cooled copper holder in an induction furnace under flowing argon. Upon recovery of the reaction product, X-ray analysis shows the presence of TiC and a mixed matrix of TiAl, $TaAl_3$, and $TaAl_2$.

EXAMPLE 11

An intermetallic-ceramic composite of titanium diboride in a matrix of titanium aluminide ($Al_3Ti$) is prepared by the master concentrate route. A solidified melt comprising 30 weight percent titanium diboride in a titanium aluminide matrix is comminuted to particles having an average size of about 1 millimeter, and then a melt of about 860 grams of titanium aluminide is prepared under a protective inert atmosphere. The particles are then added to the melt and held at that temperature for a sufficient period of time to insure complete melting of the intermetallic phase of the particles, and a uniform distribution of the titanium diboride. The melt is then solidified to yield a composite of 15 weight percent titanium diboride dispersed in a titanium aluminide matrix.

An intermetallic-ceramic composite is prepared by the direct addition route, by mixing 65.5 grams of titanium, 10 grams of boron, and 24.2 grams of aluminum, compacting, and incrementally adding to a molten pool of TiAl under inert atmosphere. On addition of the compact to the molten pool, a reaction occurs resulting in the formation of fine, evenly dispersed $TiB_2$ particles. Upon completion of the addition, the mixture is cast and recovered as a dispersion of $TiB_2$ in a matrix of TiAl.

EXAMPLE 12

A mixture of appropriate amounts of titanium, silicon, and copper powders to form 60 volume percent $TiSi_2$ is compacted and subsequently heated under an inert atmosphere to initiate a reaction and the precipitation of $TiSi_2$ in a copper matrix. The resultant concentrate is added to molten gold to produce a composite having $TiSi_2$ particles in a $Cu_3Au$ matrix.

In some cases where the intermetallic matrix phase formation does not go to completion, it may be desirable to homogenize the final product in the solid state to complete the conversion of the intermetallic precursors to the intermetallic. For example, in the formation of $TiB_2$ in TiAl from the elemental powders, it is found that on recovery of the final product, in addition to TiAl, small amounts of $Ti_3Al$ and $Ti_2Al$ are present. Subsequently, homogenization of this composite at 1000° C. for 3 hours essentially eliminates all intermetallics except TiAl.

It should be noted that the process disclosed herein for making second phase containing composites with an intermetallic containing matrix has a number of advantages over powder metallurgical methods taught by the prior art for preparing intermetallic materials. For example, the present process circumvents the need for submicron, unagglomerated second phase or intermetallic starting materials, which materials are not normally commercially available, and which are often pyrophoric. The present process also eliminates the technical problems of uniformly dispersing a second phase in an intermetallic, and avoids the problem of oxides at the intermetallic/intermetallic or second phase/intermetallic interface during processing. Further, the process yields an intermetallic-second phase composite with a second phase precipitated in-situ therein, having one or more of the following properties: superior hardness, ductility, and modulus qualities superior to currently available intermetallic containing materials. The composites also have improved high temperature stability, since the second phase is selected such that it is not reactive with the matrix, and thus the composites can be welded while maintaining uniformly dispersed discrete fine particles, and the resultant weldment possesses superior corrosion resistance when compared to the welded metal matrix composites presently available.

It is understood that the above description of the present invention is susceptible to considerable modification change, and adaptation by those skilled in the art, and such modifications, changes, and adaptations are intended to be considered to be within the scope of the present invention, which is set forth by the appended claims.

We claim:

1. A method for the preparation of intermetallic-second phase composite materials, said method comprising: contacting reactive precursors of a second phase material and a solvent matrix material comprising an intermetallic or precursors thereof at a temperature sufficient to permit diffusion of said second phase precursors into said solvent matrix materials and to initiate the exothermic reaction of said second phase precursors; permitting the temperature to rise as a result of said reaction to enable solvent assisted formation of the second phase in said solvent matrix material; and recovering a composite comprising an intermetallic containing matrix having particles of said second phase dispersed therein.

2. A method as set forth in claim 1, wherein said reactive precursors of said intermetallic are aluminum, nickel, copper, titanium, cobalt, iron, platinum, gold, silver, niobium, tantalum, boron, lead, zinc, molybdenum, yttrium, hafnium, tin, tungsten, lithium, magnesium, beryllium, thorium, silicon, chromium, vanadium, zirconium, manganese, scandium, lanthanum, rare earth elements, or alloys thereof.

3. A method as set forth in claim 2, wherein said second phase comprises an intermetallic material other than the matrix intermetallic.

4. A method as set forth in claim 1, wherein said second phase comprises a ceramic.

5. A method as set forth in claim 1, wherein the reactive second phase precursors and intermetallic precursors are each provided as individual elements.

6. A method as set forth in claim 1, wherein said reactive second phase precursors and intermetallic precursors are provided as alloys.

7. A method as set forth in claim 1, wherein at least one reactive precursor of said second phase material is a transition metal of the third to sixth group of the Periodic Table.

8. A method as set forth in claim 1, wherein at least one second phase precursor is aluminum, titanium, silicon, boron, carbon, sulfur, molybdenum, tungsten, vanadium, zirconium, niobium, cobalt, nitrogen, oxygen, nickel, iron, magnesium, beryllium, manganese, zinc, lithium, yttrium, hafnium, tantalum, chromium, thorium, a refractory metal, a rare earth metal, or a reactive compound thereof.

9. A method as set forth in claim 8, wherein at least one intermetallic precursor is aluminum, nickel, titanium, cobalt, iron, or a refractory metal.

10. A method as set forth in claim 9, wherein said second phase precursors are titanium, zirconium, hafnium, boron, silicon, oxygen, nitrogen, or carbon.

11. A method as set forth in claim 10, wherein the intermetallic is Ti$_3$Al.

12. A method as set forth in claim 11, wherein the second phase precursors are titanium and boron.

13. A method as set forth in claim 11, wherein the second phase precursors are titanium and carbon.

14. A method as set forth in claim 10, wherein the intermetallic is TiAl.

15. A method as set forth in claim 14, wherein the second phase precursors are titanium and boron.

16. A method as set forth in claim 14, wherein the second phase precursors are titanium and carbon.

17. A method as set forth in claim 10, wherein the intermetallic is TiAl$_3$.

18. A method as set forth in claim 17, wherein the second phase precursors are titanium and boron.

19. A method as set forth in claim 17, wherein the second phase precursors are titanium and carbon.

20. A method as set forth in claim 10, wherein the intermetallic is NiAl.

21. A method as set forth in claim 10, wherein the intermetallic is Ni$_3$Al.

22. A method as set forth in claim 21, wherein the second phase precursors are titanium and boron.

23. A method as set forth in claim 21, wherein the second phase precursors are zirconium and carbon.

24. A method as set forth in claim 21, wherein the second phase precursors are zirconium and boron.

25. A method as set forth in claim 1, wherein plural second phase materials are produced.

26. A method as set forth in claim 25, wherein the second phase precursors are compounds selected from boron carbide, boron nitride, and boron oxide.

27. A method as set forth in claim 25, wherein one of said second phase materials is an oxide or a nitride.

28. A method as set forth in claim 27, wherein said oxide is an oxide of yttrium, cerium, erbium, or a rare earth element.

29. A method as set forth in claim 1, wherein said intermetallic containing matrix comprises a mixture of intermetallic materials.

30. A method as set forth in claim 1, wherein said reactive second phase precursors and said solvent matrix material are added to molten intermetallic material.

31. A method as set forth in claim 30, wherein said molten intermetallic material is other than the intermetallic of the solvent matrix material.

32. A method as set forth in claim 1, wherein said reactive second phase precursors and said solvent matrix material are added to molten intermetallic precursor.

33. A method as set forth in claim 1, wherein at least one of said intermetallic precursors is a compound.

34. A method as set forth in claim 1, wherein at least one second phase precursor is a hydride.

35. A method for forming an intermetallic material having a finely divided second phase material precipitated in-situ therein, said method comprising the steps of: contacting reactive precursors of second phase material, in the presence of reactive precursors of intermetallic material in which said second phase material precursors are more soluble than said second phase material; raising the temperature of said reactive precursors to a temperature at which sufficient diffusion of said precursors of said second phase materials into at least one of said reactive precursors of said intermetallic material occurs to cause the initiation of a solvent assisted exothermic reaction of the precursors of said second phase, thereby forming second phase particles in-situ; forming the intermetallic material from the precursors thereof; and recovering a composite comprising an intermetallic containing matrix with said second phase particles dispersed therein.

36. A method as set forth in claim 35, wherein at least one intermetallic precursor is aluminum, nickel, titanium, cobalt, iron, or a refractory metal.

37. A method as set forth in claim 36, wherein at least one of said second phase precursors is selected from titanium, zirconium, hafnium, boron, silicon, oxygen, nitrogen, and carbon.

38. A method as set forth in claim 35, wherein said reactive precursors are added to molten intermetallic material.

39. A method as set forth in claim 38, wherein said molten intermetallic material is other than the intermetallic formed by the reactive intermetallic precursors.

40. A method as set forth in claim 35, wherein said reactive precursors are added to molten intermetallic precursor.

41. A method for making intermetallic-second phase composites, said method comprising: contacting second phase forming constituents and an intermetallic material in which said second phase forming constituents are more soluble than the second phase; heating to a temperature at which sufficient diffusion of said reactive second phase forming constituents into an intermetallic derived solvent material occurs to cause an exothermic solvent assisted reaction of said constituents, thereby precipitating second phase particles in-situ in said intermetallic derived solvent; and recovering a material comprising finely divided second phase particles in an intermetallic containing matrix.

42. A method as set forth in claim 41, wherein the temperature is at least about the melting temperature of said intermetallic material.

43. A method as set forth in claim 41, wherein at least one intermetallic precursor is aluminum, nickel, titanium, cobalt, iron, or a refractory metal.

44. A method as set forth in claim 43, wherein at least one of said second phase forming constituents is selected from titanium, zirconium, hafnium, boron, silicon, oxygen, nitrogen, and carbon.

45. A method as set forth in claim 41, wherein said constituents and said intermetallic material are added to molten intermetallic.

46. A method as set forth in claim 41, wherein said constituents and said intermetallic material are added to molten intermetallic precursor.

47. A method as set forth in claim 41, wherein said second phase forming constituents and said intermetallic material are provided as premixed and compacted powders.

48. A method for making intermetallic-second phase composites, said method comprising: contacting a reaction mixture consisting of second phase forming constituents and a first precursor of an intermetallic material, said second phase forming constituents being more soluble in said intermetallic precusor than said second phase; heating said reaction mixture to a temperature at which sufficient diffusion of said second phase forming constituents into said first intermetallic precursor occurs to initiate an exothermic solvent assisted reaction of said constituents and to form a second phase precipitate in-situ in said first intermetallic precursor; adding said second phase precipitate in said first intermetallic precursor to a molten mass of a second intermetallic precursor to thereby form an intermetallic having second phase particles therein; and recovering a material comprising finely divided second phase particles in an intermetallic containing matrix.

49. A method as set forth in claim 48, wherein the temperature is at least about the melting temperature of said first intermetallic precursor.

50. A method as set forth in claim 48, wherein said second phase precipitate in said first intermetallic precursor is added to molten intermetallic.

51. A method as set forth in claim 48, wherein a solid mass of said second intermetallic precursor is mixed with said second phase precipitate in said first intermetallic precursor, and heated to form the intermetallic.

52. A method as set forth in claim 48, wherein said reaction mixture is added to a molten mass of said first intermetallic precursor to initiate said reaction.

53. A method as set forth in claim 52, wherein a solid mass of said second intermetallic precursor is mixed with said second phase precipitate in said first intermetallic precursor, and heated to form the intermetallic.

54. A method as set forth in claim 52, wherein said second phase precipitate in said first intermetallic precursor is added to molten intermetallic.

55. A method as set forth in claim 48, wherein said reaction mixture is added directly to an intermetallic derived liquid.

56. A method as set forth in claim 48, wherein said reaction mixture is added directly to a molten mass of a second intermetallic precursor to initiate said reaction.

57. A method as set forth in claim 48, wherein at least one intermetallic precursor is aluminum, nickel, titanium, cobalt, iron, or a refractory metal.

58. A method as set forth in claim 57, wherein at least one of said second phase precursors is selected from titanium, zirconium, hafnium, boron, silicon, oxygen, nitrogen, and carbon.

59. A method for making intermetallic-second phase composites, said method comprising; adding one or more second phase precursors to a molten reaction mixture comprising an intermetallic derived solvent and at least one complementary second phase precursor; forming said second phase by an exothermic solvent assisted reaction in said molten reaction mixture; and recovering a material comprising a dispersion of second phase particles in an intermetallic containing matrix.

60. A method as set forth in claim 59, wherein at least one intermetallic precursor is aluminum, nickel, titanium, cobalt, iron, or a refractory metal.

61. A method as set forth in claim 60, wherein said second phase precursors are titanium, zirconium, hafnium, boron, silicon, oxygen, nitrogen, or carbon.

62. A method for making intermetallic-second phase composites, said method comprising: adding one or more second phase precursors and an intermetallic precursor to a melt of one or more intermetallic precursors and at least one complementary second phase precursor; permitting an exothermic solvent assisted reaction of the respective precursors; and recovering a dispersion of second phase particles in an intermetallic containing matrix.

63. A method as set forth in claim 62, wherein at least one intermetallic percursor is aluminum, nickel, titanium, cobalt, iron, or a refractory metal.

64. A method as set forth in claim 63, wherein said second phase precursors are titanium, zirconium, hafnium, boron, silicon, oxygen, nitrogen, or carbon.

* * * * *